US006049701A

United States Patent [19]

Sparksman

[11] Patent Number: 6,049,701
[45] Date of Patent: Apr. 11, 2000

[54] CORDED TO UNCORDED TELEPHONE CONVERSION KIT

[75] Inventor: Steven William Sparksman, Calgary, Canada

[73] Assignee: Nortel Networks Corporation, Montreal, Canada

[21] Appl. No.: 09/003,748

[22] Filed: Jan. 7, 1998

[51] Int. Cl.[7] .......... H04B 1/40

[52] U.S. Cl. .......... 455/74.1; 455/41; 455/462; 455/550

[58] Field of Search .......... 455/74.1, 74, 462, 455/572, 573, 575, 90, 95, 100, 346, 349, 41

[56] References Cited

U.S. PATENT DOCUMENTS

| | | |
|---|---|---|
| 3,919,491 | 11/1975 | Luce . |
| 3,938,018 | 2/1976 | Dahl . |
| 4,752,949 | 6/1988 | Steinbeck et al. . |
| 4,908,847 | 3/1990 | Hannon et al. . |
| 4,937,852 | 6/1990 | Manzarek . |
| 5,010,565 | 4/1991 | Nash et al. . |
| 5,396,538 | 3/1995 | Hong . |
| 5,680,441 | 10/1997 | Gallo . |

FOREIGN PATENT DOCUMENTS

| | | |
|---|---|---|
| 0 282 597 A1 | 8/1987 | European Pat. Off. . |
| 0 659 003 A1 | 12/1994 | European Pat. Off. . |
| 2313 733 | 12/1997 | United Kingdom . |

OTHER PUBLICATIONS

TELUS Marketing Brochure issued approximately Fall of 1997.

*Primary Examiner*—Lee Nguyen
*Attorney, Agent, or Firm*—Klarquist Sparkman Cambell Leigh & Whinston, LLP

[57] ABSTRACT

A kit for converting to cordless operation a telephone having a corded handset and a base unit, the base unit having a handset connector jack and a handset receiving cradle for matingly cradling the handset and the corded handset having a housing, a microphone, a speaker, and a cord for electrically connecting the handset to the handset jack. The kit includes a module having a fastener for fixing the module in mating engagement with the base unit and a connector for electrically connecting the module to the handset jack. An uncorded handset mating with the handset receiving cradle is provided, the uncorded handset having a housing generally matching that of the corded handset. The module and uncorded handset exchange signals via radio transmitters and receivers and contain switches responsive to cradling and uncradling of the uncorded handset so that the converted telephone operates as if the uncorded handset remained connected by a handset cord to the base, while the overall shape and configuration of the telephone is preserved.

12 Claims, 6 Drawing Sheets

CORDED TO UNCORDED TELEPHONE CONVERSION KIT

FIELD OF THE INVENTION

This invention relates to kits for converting a corded telephone to uncorded operation, and a telephone thus converted.

BACKGROUND OF THE INVENTION

Many telephones, particularly those normally referred to as desktop telephones, have a handset and a base unit, with the handset merely providing a convenient housing for a microphone and a speaker while the base unit provides a hookswitch for connecting and disconnecting the telephone from a telephone central office, a dialpad for initiating telephone calls, and all of the electrical components necessary for the user of the telephone to place and receive calls. The handset is typically connected to the base unit by a handset cord having a handset plug for connection to a handset jack provided in the base unit. A second type of telephone, typically for home use, has the dialpad and hookswitch integrated into the handset so that the base unit merely provides a hookswitch actuating cradle for the telephone. In both types of telephones the handsets include cords and could be described as “corded”. However, the present invention is limited to telephones of the type described above having no dialpad nor hookswitch in the handset, which are referred to as “corded telephones” below. A typical such corded telephone is illustrated in FIGS. 1 and 2 of the attached drawings.

A “cordless” telephone herein shall mean a telephone comprised of a base station and a portable terminal (handset). The portable terminal provides all of the essential functions of the telephone, where by contrast the handset of a corded telephone does not. For example, calls may be made and terminated from the portable terminal of a cordless telephone without returning to the base station. Further, cordless telephones generally differ in appearance from corded telephones in ways other than the absence of a cord because of the need for the portable terminal to have a full set of controls (e.g., a dialpad and a talk switch) and normally an external antenna.

An alternative to both corded and cordless telephones is what is referred to herein as “uncorded telephone”. An uncorded telephone shall mean a telephone having no cord between the base unit and the handset, but which in mode of operation is essentially the same as a corded telephone.

Users of corded telephones, such as that illustrated in FIGS. 1 and 2, are tied to their telephone’s base unit by the handset cord. If, during a conversation, a need arises to retrieve information or perform another task at a location beyond the reach of the handset cord, the user must interrupt his or her conversation and put the handset down. Users do have the option of purchasing a cordless telephone in addition to their existing corded telephone, however, this can be undesirable for a number of reasons:

(1) Cordless telephones are typically expensive.
(2) Some telephone companies charge more for additional telephones within the same residence or office.
(3) Cordless telephones tend to not be as rich in features as existing corded telephones.
(4) Users may want to maintain the method of operation and aesthetics of their existing corded telephone.

Therefore, conversion of an existing corded telephone to uncorded operation would seem to be preferable to purchase of a cordless telephone. However, in the prior art known to the inventor in which conversion of a corded telephone to uncorded operation is disclosed, substantial change to the appearance or method of operation of the corded telephone is a consequence of the conversion.

For example, Nash et al., U.S. Pat. No. 5,010,565, discloses an apparatus and method for adding uncorded handset to an existed corded telephone. While Nash et al. discloses a conversion kit that does not appear to require internal modification of the base unit, installation of the cradle 100 or cradles 150/160 shown in FIGS. 1, 2, and 3 of Nash et al. changes the external appearance of the base unit noticeably. Further, the cordless base 126A/126B illustrated in FIG. 1 and 2 of Nash et al. adds another unit to the user’s desktop, with the necessary added connecting cords, and would be difficult to use to convert a wall mounted telephone to uncorded operation. Further, Nash et al. discloses recharging of the handset battery by electrical contacts located in a cradle and in the handset. While such contacts are commonly used in cordless phones, the use of such contacts in a corded telephone converted to uncorded operation would change the appearance and reliability of the telephone significantly.

Steinbeck et al., U.S. Pat. No. 4,752,449, discloses a combination corded/cordless telephone that can be operated either as a corded telephone or, by removing a cord between the handset and base unit, may be operated as a cordless, not an uncorded, telephone. However, no conversion kit for converting corded telephones such as that shown in FIGS. 1 and 2 to uncorded operation is disclosed by Steinbeck et al.

Hannon et al., U.S. Pat. No. 4,908,847, discloses an adaptor set for converting a standard telephone into an uncorded telephone by the replacement of the cord between the handset and the base unit with a two piece adaptor, one adaptor for the handset and one adaptor for the base unit, each adaptor containing a radio frequency transmitter/receiver. The adaptors are clearly visible as appendages to the handset and base unit. The adaptor for the handset would necessarily require a battery, but no means is disclosed for recharging the battery without removal of the battery from the handset adaptor. The need to periodically replace or recharge the battery would be inconvenient to the user. Further, the battery would appear to be subject to constant discharge as no means is disclosed for activating the handset transmitter/receiver only when the handset is off-hook.

Gallo, U.S. Pat. No. 5,680,441, discloses an improved version of the adaptor disclosed in Hannon et al. The continuous discharge of the handset battery is allegedly avoided by a motion detection switch which activates the handset transmitter/receiver only for a period of time after the handset is moved (presumably when it is taken off-hook). Use of a replaceable long-life battery in the handset or recharging of the battery using a recharging jack built into the handset is suggested. The user would have to pay attention the level of remaining battery power to avoid a conversation being interrupted or would have to remember to plug in the battery charger when returning the handset to the base unit. The stationary transmitter/receiver is a separate unit connected to the existing telephone base unit, with the disadvantages of the apparatus disclosed in Nash et al. as discussed above, and is provided with a DC power adaptor and external antenna.

Manzarek, U.S. Pat. No. 4,937,852, discloses an is alternative approach, namely, interposing a base unit and portable unit between the telephone line and a corded telephone. The entire corded telephone is connected to the portable unit, which simulates a telephone line connection, but includes a radio receiver/transmitter for communication with the base unit. The base unit, also containing a radio receiver/transmitter, is connected directly to a telephone line. The entire corded telephone can then be moved around within the range of the radio receiver/transmitters, but the handset is still connected by a cord to the corded telephone base. Carrying the entire telephone around would appear to be less convenient than carrying only a handset as in an uncorded telephone.

SUMMARY OF THE INVENTION

In general terms the present invention provides for conversion of a corded telephone to an uncorded telephone in a manner that preserves both the entirety of the operation of the corded telephone without any change and the overall shape and configuration of the corded telephone.

The present invention is directed in one aspect to providing a conversion kit for converting to uncorded operation a telephone having a connected handset and a base unit, the base unit having a handset connector jack and a handset receiving cradle for matingly cradling the handset, the handset having a housing, a microphone, a speaker, and a cord with a plug for connecting the handset to the handset jack. The kit comprises a module having means for intimate physical attachment to the base unit and a cord for connection to the handset jack and an uncorded replacement handset mating with the handset receiving cradle, the uncorded handset having a housing generally matching that of the connected handset and including a microphone and a speaker. Electromagnetic transmitter/receivers contained within the module and the uncorded handset, convey signals from the handset jack to the speaker of the uncorded handset and from the microphone of the uncorded handset to the handset jack when the module and handset are turned on. Switches, contained within the module and the uncorded handset, are also provided by which both the module and the uncorded handset transmitter/receivers are turned on by the removal of the uncorded handset from the cradle and turned off by the re-cradling of the uncorded handset in the base cradle.

In another aspect the present invention is directed to an uncorded telephone of the type provided by modifying an existing corded telephone using a kit of the described type in accordance with the invention.

DETAILED DESCRIPTION OF THE PREFERRED EMBODIMENT

For a better understanding of the present invention, one type of corded telephone suitable for conversion to uncorded operation in accordance with the present invention will first be described with reference to FIGS. 1 and 2.

Figure 1:
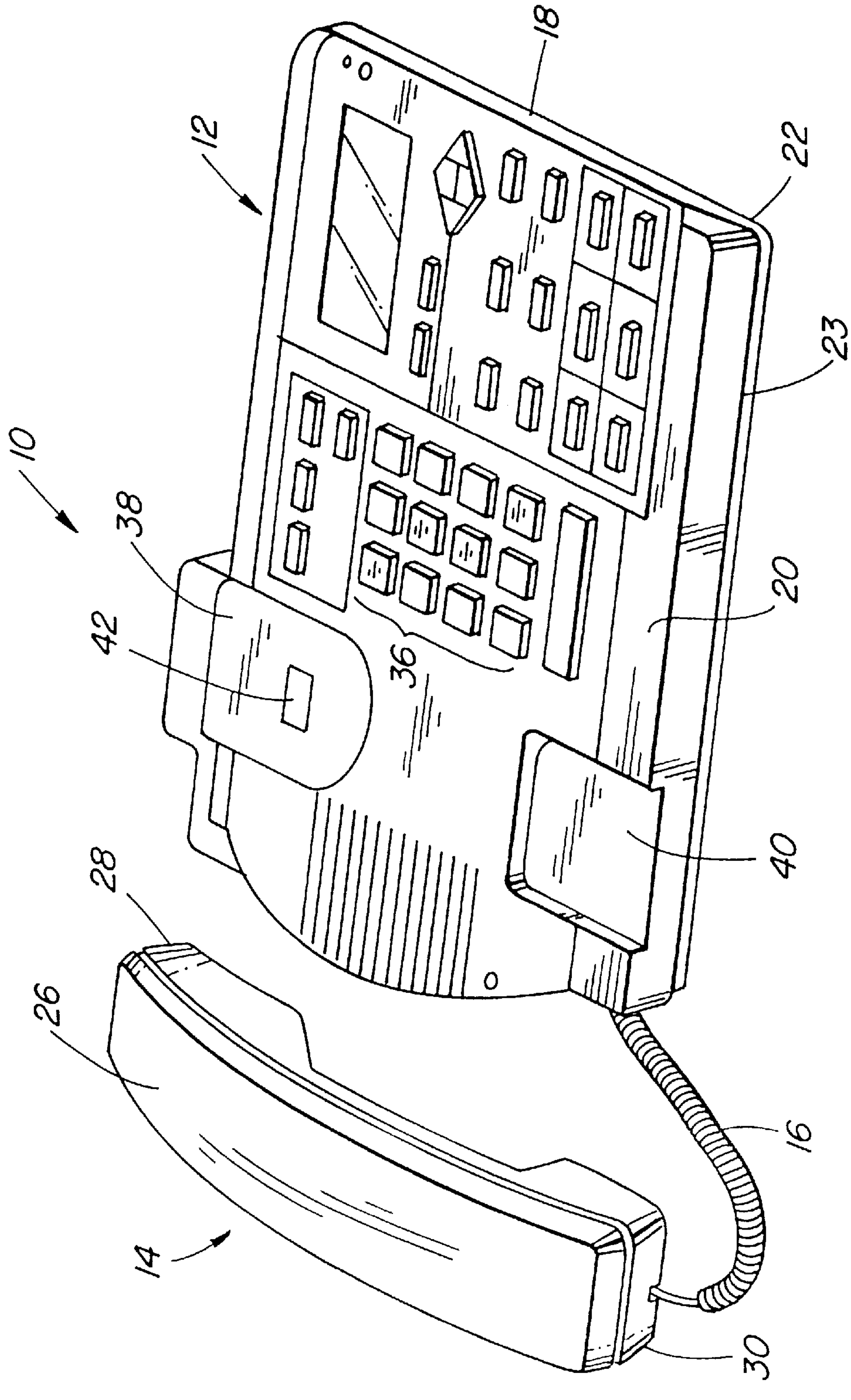
FIG. 1 is a front perspective view of a typical corded telephone of the type that may be converted to uncorded operation in accordance with the present invention.
Figure 2:
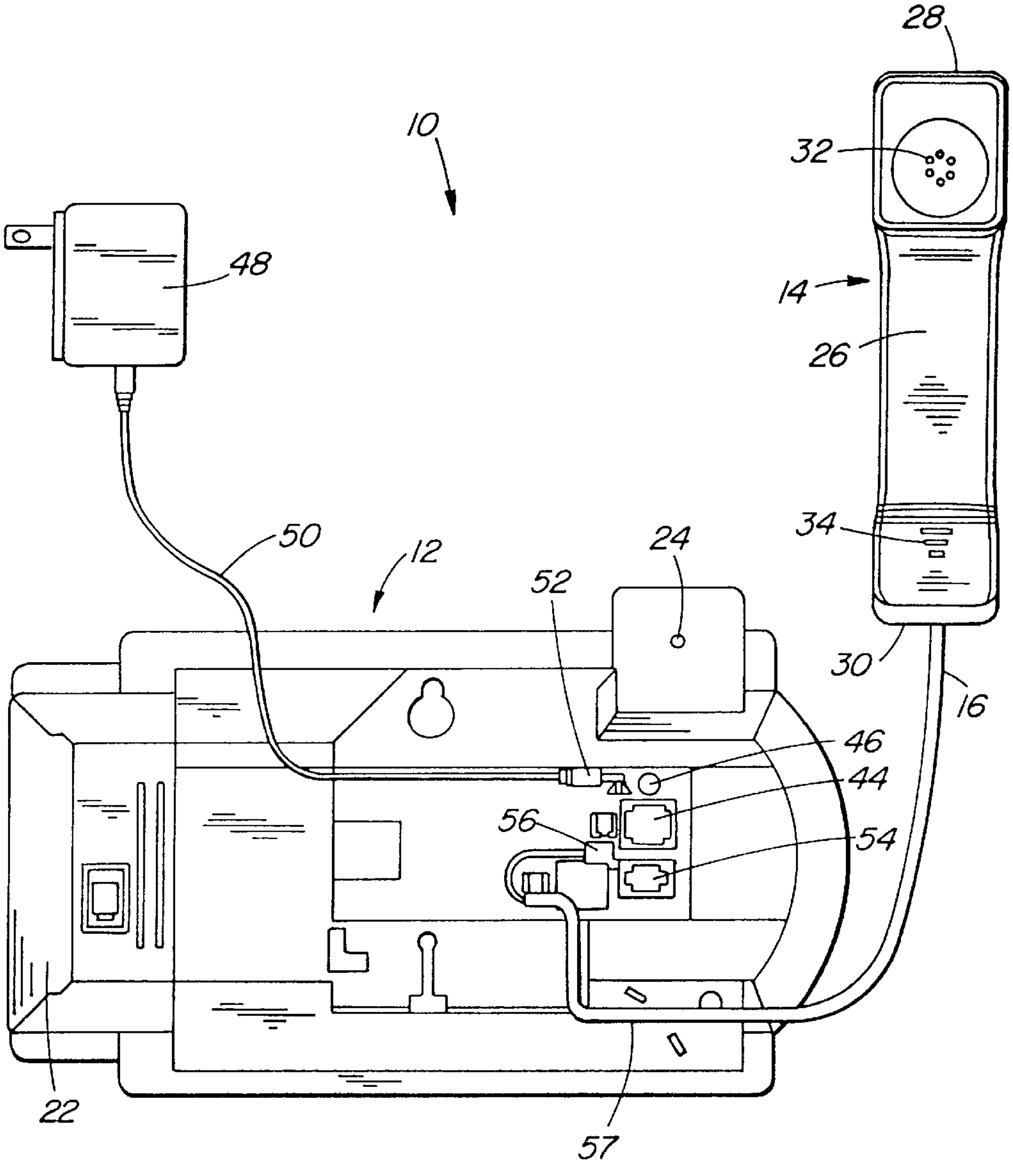
FIG. 2 is a bottom view of the corded telephone of FIG. 1.

A typical corded telephone suitable for conversion to uncorded operation is generally indicated by reference numeral 10 in FIGS. 1 and 2 and is comprised of a base unit 12 and a corded handset 14 connected to the base unit by a handset cord 16.

The base unit 12 is comprised of a two-piece housing 18 having a top 20 and bottom 22 held together along a parting gap 23 by several screws, one of which is indicated by reference numeral 24 in FIG. 2.

The corded handset 14 is comprised of a elongated housing 26 having a speaker containing end 28 and a microphone containing end 30. The speaker and microphone contained within the housing 26 are not visible in FIGS. 1 and 2, but speaker and microphone grillwork openings, behind which the speaker and microphone are installed, are indicated by reference numerals 32 and 34, respectively, are shown in FIG. 2.

As illustrated in FIG. 1, the top 20 of the base unit 12 is provided with a dialpad 36, upper handset cradle 38 and lower handset cradle 40, and a hookswitch 42 in the upper handset cradle 38. The upper handset cradle 38 and the lower handset cradle 40 respectively provide cradling for the speaker end 28 and microphone end 30 of the corded handset 14, when the corded handset 14 is placed upon the base unit 12. Placing the corded handset 14 upon the base unit 12 operates the hookswitch 42 to place the telephone "onhook", while lifting the corded handset 14 from the base unit 12 operates the hookswitch 42 to place the telephone "offhook".

As illustrated schematically in FIG. 2, the underside of the base unit 12 is provided with a modular telephone line jack 44. A telephone line cord (not shown) having modular plugs at each end may then be used to connect the base unit 12 to a modular wall jack (not shown) that is in turn is connected to telephone central office. The base unit 12 is also provided with a power adaptor jack 46. A power adaptor 48 having a power cord 50 ending in a plug 52 connectable to the jack 46 is used to provide power to the base unit 12. The base unit 12 is further provided with a modular handset jack 54. The handset cord 16 is provided with a modular handset plug 56, so that the corded handset 14 may be connected to the base unit 12 by plugging the handset plug 56 into the jack 54. A cord guide 57 is provided to guide and secure the handset cord 16 to the housing bottom 22. Screw 24 passes through the bottom 22 into the top 20 directly behind the upper handset cradle 38.

A preferred embodiment of the present invention for conversion of the type of corded telephone described above is comprised of an RF module, an uncorded handset, and a module power adaptor, generally indicated by reference numerals 58, 60, and 61, respectively, in FIGS. 3, 4, 5, and 6.

Figure 4:
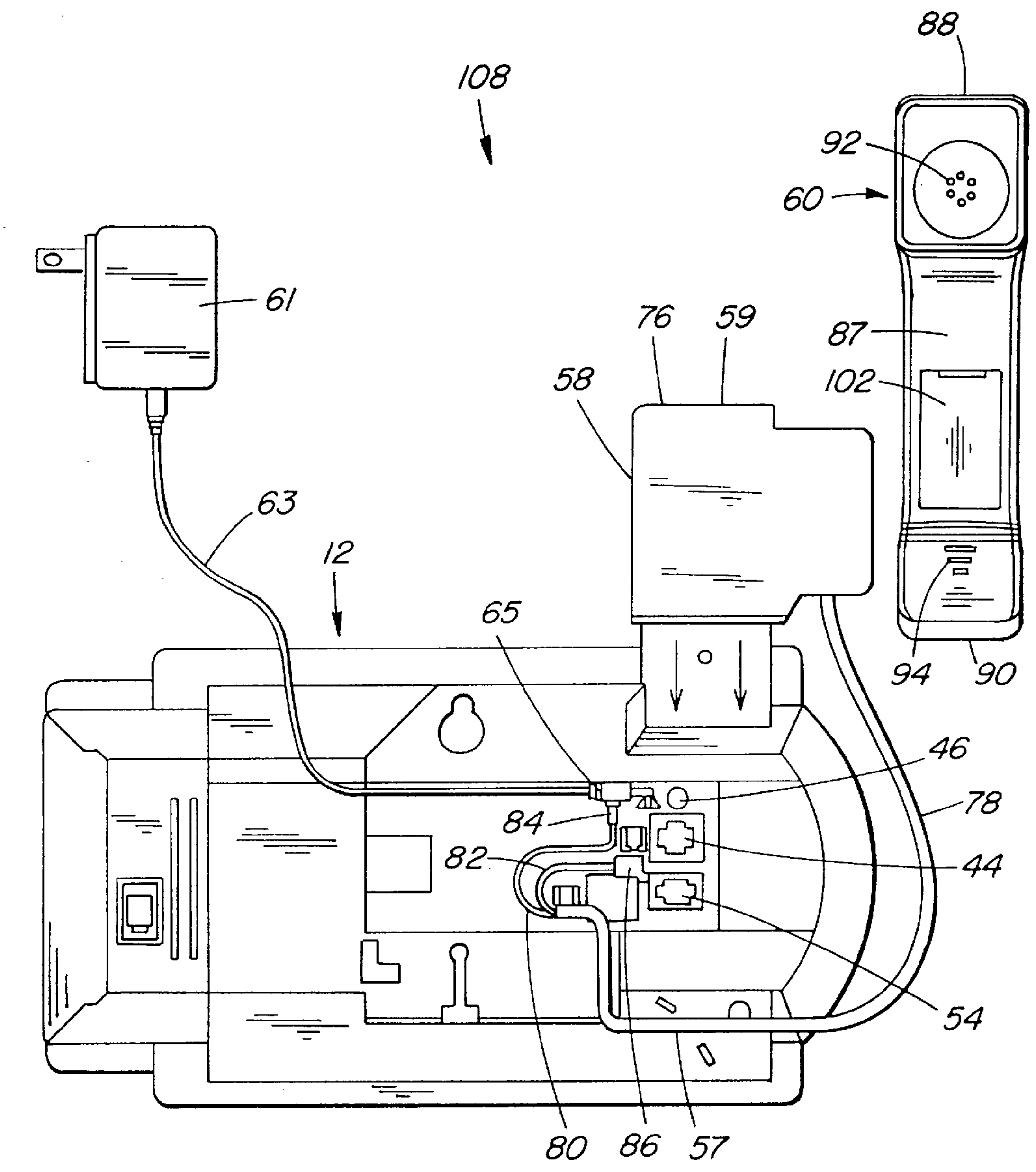
FIG. 4 is a bottom view of the converted corded telephone of FIG. 3 showing the module and uncorded handset.
Figure 5:
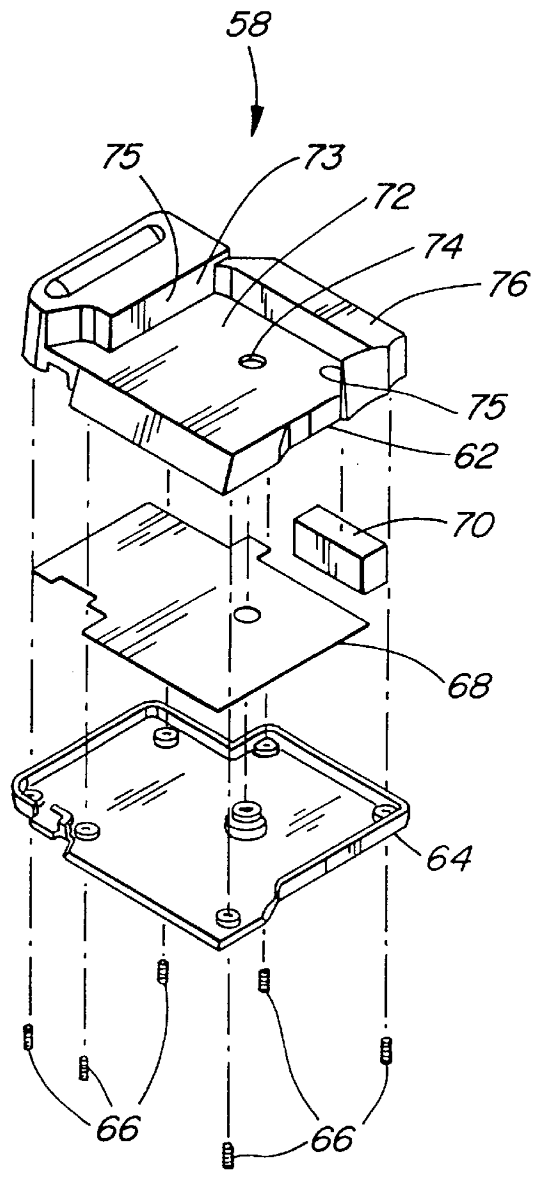
FIG. 5 is an exploded perspective view of the module of FIGS. 3 and 4.

As illustrated in FIGS. 4 and 5, the RF module 58 is generally comprised of a housing 59 having a top 62 and a bottom 64, which when assembled together using screws 66 enclose a printed circuit board 68 and an inductive charge transmitting coil 70. Horizontal ribs 73 (one of which is visible in FIG. 5) protrude from inside vertical side walls 75 of the top 62. Upper surface 72 and side walls 75 of the top 62 are molded to fit snugly against the underside and edges of the corner of the base unit 12 in which the upper cradle 38 is formed. A mounting hole 74 passes through the top 62, printed circuit board 68, and bottom 64 for mounting the module to the base unit 12. A mounting screw (not shown) is provided that is sufficiently longer than screw 24 to pass through the mounting hole 74 to secure the module 58 to the base unit 12 and take the place of screw 24 in securing together the top 20 and bottom 22 of the housing 18. The RF module 58 when mounted to the base unit housing 18 extends somewhat beyond the edges of the base unit housing 18. In particular, a portion 76 of the RF module housing 59 extends the surface of the upper cradle 38 and contains the inductive charge transmitting coil 70.

As illustrated in FIG. 4, the RF module 58 is provided with an external combined cord 78 that is internally connected to the printed circuit board 68, the combined cord 78 comprising a module power cord 80 and a handset jack connector 82. The module power cord 80 is provided with a power plug 84. The module power adaptor 61 is provided with a power adaptor cord 63 ending in a connector 65 connectable to the jack 46 and the power plug 84. The distal end of the handset jack connector 82 is provided with a modular plug 86 connectable to the handset jack 54.

Figure 6:
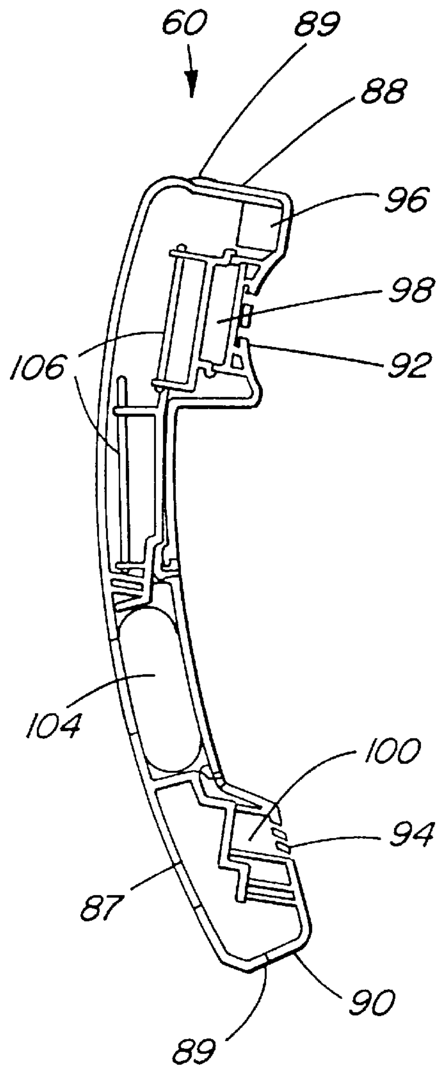
FIG. 6 is a sectional side view of the uncorded handset of FIGS. 3 and 4.

As illustrated in FIG. 6, the uncorded handset 60 is comprised of a housing 87, the external shape of which generally matches that of the housing 26 of the corded handset 14, having a speaker containing end 88 and a microphone containing end 90. The uncorded handset housing 87 is comprised of two parts, which may be separated along a parting gap 89. The speaker 98 and microphone 100 contained within the housing 87 are shown in FIG. 6 and speaker and microphone grillwork openings, behind which the speaker 98 and microphone 100 are installed, are indicated by reference numerals 92 and 94, respectively, are shown in FIG. 4.

Figure 3:
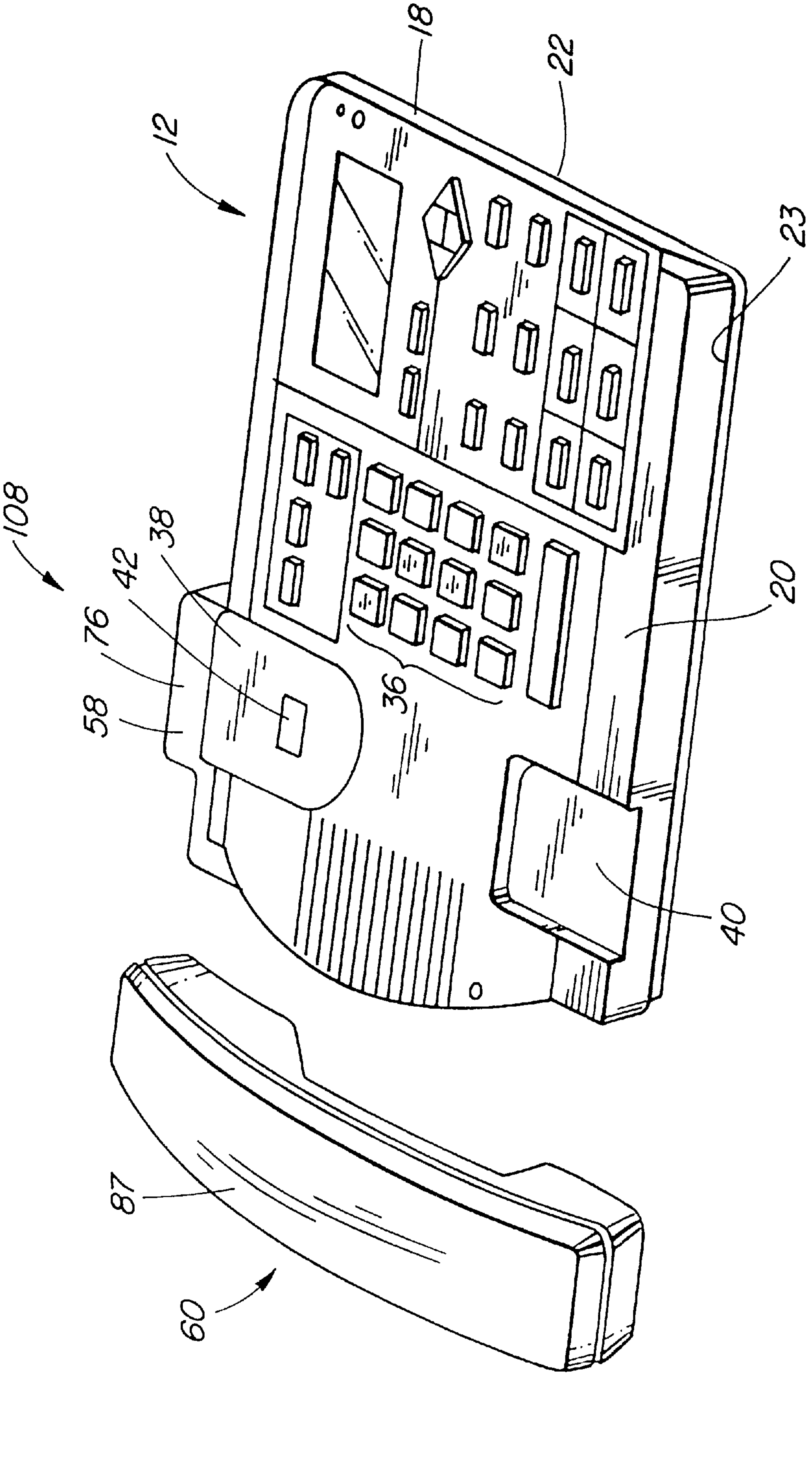
FIG. 3 is a front perspective view of the corded telephone of FIG. 1 converted to uncorded operation in accordance with the present invention.

As a comparison of FIGS. 3 and 5 with FIGS. 4 and 6 will disclose, the only difference in the shape of the uncorded handset 60 from that of the corded handset 14 is that the speaker end 88 is extended longitudinally as compared to the speaker end 28, providing an additional internal space for an inductive charge receiving coil 96, shown in FIG. 6. The uncorded handset 60 is otherwise indistinguishable in appearance from the corded handset 14 except for the presence of a battery access door 102 and an optional manual change channel key (not shown) and the absence of the handset cord 16 or a jack to receive the handset cord 16. Alternatively, portion 76 of the RF module 58 and the speaker end 88 of the uncorded handset 60 could each be provided with electrically conducting charging contacts as known in the prior art, but at the expense of appearance and reliability.

When the uncorded handset 60 is cradled in the cradles 38/40, the longitudinally extended speaker end 88 containing the inductive charge receiving coil 96 is in close proximity to the portion 76 of the module 58 containing the inductive charge transmitting coil 70, so that an alternating current in the inductive charge transmitting coil 70 induces an alternating current in the inductive charge receiving coil 96.

The uncorded handset 60 also comprises a rechargeable battery 104, two printed circuit boards 106, and receiving and transmitting antennas (not shown).

The kit, comprised of the RF module 58, the uncorded handset 60, and the module power adaptor 61, is used to convert the corded telephone 10 to an uncorded telephone, generally indicated by reference numeral 108 in FIG. 3 and 4, in the following manner. The handset cord 16 connecting the corded handset 14 to the handset jack 54 and the power connector plug 52 are unplugged and removed from the base unit 12 and the corded handset 14, handset cord 16, and the adaptor 48 discarded or retained for possible reconversion to corded operation. Screw 24 is removed from the housing 22 and also discarded or retained for possible reconversion. The RF module 58 is then slid into place behind the upper cradle 38 as illustrated in FIG. 4, the ribs 73 engaging the parting gap 23 between the top 20 and bottom 22 of the base unit housing 18. A screw (not shown) that is longer than screw 24 is preferably used to secure the RF Module to the housing 22 as well as to hold the housing 22 together, but replacing the screw 24 is not essential as the ribs 73 tend hold the module 58 in place adequately under most circumstances. Connector 65 is then plugged into the power adaptor jack 46, cord 78 is run through the cord guide 57, the power connector plug 84 plugged into the connector 65, and the modular plug 86 plugged into the handset jack 54. The module 58 and uncorded handset 60 replace the corded handset 14.

Once the RF module 58 is installed on the base unit 12 and if the base unit 12 is connected to the telephone central office via line jack 44 and the module power adaptor 61 connected to external line voltage, the uncorded telephone 108 will operate as if the handset cord 16 connected the base unit 12 to the uncorded handset 60 with the exception that a user while carrying on a conversation using the uncorded telephone 108 may move around without being limited by the length of the cord 16. For example, the dialpad 36, the hookswitch 42, and other features of the base unit 12 remain fully functional, so unless the base unit 12 is provided with a hands-free option, the user must pick up the uncorded handset 60 from the cradles 38/40, dial calls using the dial pad 36, and hang up by replacing the uncorded handset 60 upon the cradles 38/40. The only differences in the operation of the uncorded telephone 108 from the operation of the corded telephone 10 are that a scan button (not shown) may optionally be provided on the handset 60, which when pressed causes the uncorded telephone 108 to change to another radio channel when offhook and to change the default channel and security code if pressed when onhook, and that the uncorded telephone 108 will not operate if external line voltage is not provided to the module power adaptor 61.

Figure 7:
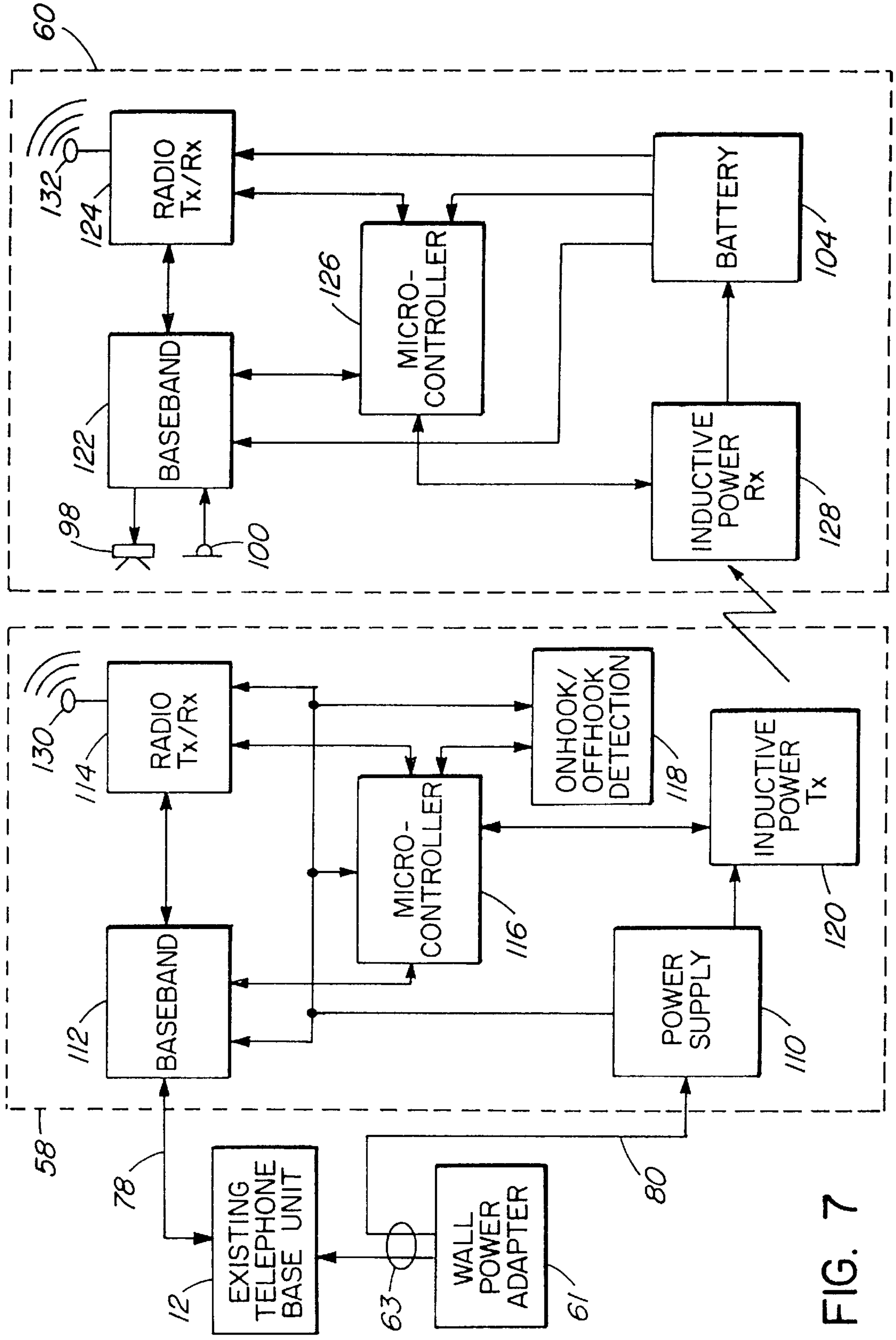
FIG. 7 is a block diagram of electrical circuits of the module and uncorded handset of FIGS. 3 and 4.

As illustrated in the block diagram FIG. 7, the RF module 58 comprises a power supply 110, a baseband circuit 112, a radio transmitter/receiver 114, a micro-controller 116, a onhook/offhook detection circuit 118, and an inductive power transmitter circuit 120. The inductive charge transmitting coil 70 is a part of the inductive power transmitter circuit 120. The uncorded handset 60 comprises the rechargeable battery 104, a baseband circuit 122, a radio transmitter/receiver 124, a micro-controller 126, and an inductive power receiver circuit 128. The inductive charge receiving coil 96 is a part of the inductive power receiver circuit 128. The radio transmitter/receivers 114/124 each include discrete transmit and receive antennas. The transmit and receive antennas of the RF module radio transmitter/receiver 114 are indicated collectively by reference numeral 130 and the transmit and receive antennas of the uncorded handset radio transmitter/receiver 124 are indicated collectively by reference numeral 132 in FIG. 7. The preferred embodiment of the invention uses four antennas, two for each receiver/transmitter, but using methods known to those skilled in the art, one antenna could be used for module receiver/transmitter 114 and a second antenna could be used for handset receiver/transmitter 124.

The blocks of FIG. 7 each use circuits generally known to those skilled in the design of cordless telephones and will therefore not be described in detail. Generally, the RF module 58 receives power from the wall adaptor 61 via power connector 80 and connects to the voice path of the base unit 12 via the handset jack 54 of the base unit 12 via handset connector 82 and plug 86.

The baseband 112 transfers audio signals received via the voice path from the base unit 12 to the radio transmitter/receiver 114 and audio signals received from the radio transmitter/receiver 114 to the base unit 12, using methods well-known in the prior art. The RF module transmitter/receiver 114 uses methods well-known in the prior art to generate, modulate with signals provided by the baseband 112 and the micro-controller 116, and send a radio signal receivable by the uncorded handset radio transmitter/receiver 124 as well as to receive radio signals sent by the uncorded handset radio transmitter/receiver 124, demodulate the received radio signals and provide audio signals to the baseband 112 and control signals to the micro-controller 116.

The uncorded handset baseband 122 and radio transmitter/receiver 124 provide the same functions for the uncorded handset 60 as provided by the module baseband 112 and radio transmitter/receiver 114, with the exception that audio signals are provided by the baseband 122 to the speaker 98 and received from the microphone 100 rather than the base unit 12.

The preferred embodiment of the invention uses 43/49 MHz (CT0 spectrum) RF technology and protocols in the transmitter/receivers 114/124, but other frequencies and protocols known to those skilled in the art may be used as well without departing from the present invention. Means, well known in the art, to change the default channel and security code by pressing the scan button when onhook and to manually scan for another channel if pressed when offhook may be used in an embodiment of the invention.

Most cordless telephone antennas known to the inventor are externally mounted and clearly visible to the user. In the preferred embodiment of the invention, the transmit and receive antennas of the RF module 58 and the uncorded handset 60 are either enclosed within the housings 59 and 87, or in the case of RF module receive antenna (not shown), comprise one wire of the power conductor 80. The transmit antennas (not shown) of the RF module 58 and the uncorded handset 60 are preferably contained at the parting gaps in the housings 59/87. The receive antenna (not shown) of the uncorded handset 60 is preferably comprised of one of the battery lead wires (not shown) running from the printed circuit boards 106 to the battery 104 and the case of the battery 104. Alternatively, external antennas may be used, but would detract from the appearance of the module 58 and uncorded handset 60.

Uncorded telephones known to the inventor have used direct electrical connection methods to charge a rechargeable battery in an uncorded handset, either by plugging charger into the handset or by contacts on a stationary base into which the handset is place when not in use. For example, see Gallo, U.S. Pat. No. 5,680,441, and Nash et al., U.S. Pat. No. 5,010,565. Inductive transfer of charging power has not been used in uncorded telephones to the knowledge of the inventor, although inductive charging is known for cordless telephones and small electrical devices. The preferred embodiment of the invention includes inductive power transmitter/receiver circuits 120/128 generally known to those skilled in the art of cordless telephone design. When the uncorded handset 60 is placed upon the cradles 38/40 with the inductive charge receiving coil 96 against the inductive charge transmitting coil 70, a charging current is provided to the rechargeable battery 104.

Conventionally, cordless telephone handsets have the functionality of a cordless telephone, such as dialpad and onhook/offhook controls, which allow calls to be answered and terminated from the cordless handset. As the uncorded handset has no dialpad or onhook/offhook controls, means should be provided for determining when to turn on the radio transmitter/receivers 114/124 to establish communication of signals between the base unit 12 and the uncorded handset 60. Although leaving the radio transmitter/receivers 114/124 on at all times is possible, regulatory authorities discourage such practices.

In the preferred embodiment of the uncorded handset 60, the radio transmitter/receiver 124 is turned on by the micro-controller 126 whenever the charging current received by the inductive charge receiving circuit 128 terminates.

In the RF module 58, the transmitter/receiver 114 could be turned on by sensing the changing load on the inductive charge transmitting circuit 120; by a simple switch similar to the hookswitch 42 located in the RF module 58 that would turn on the transmitter/receiver 114 when the uncorded handset 60 is lifted; or by the presence of an audio signal at the handset jack 54 indicating that the onhook/offhook switch 42 is in the offhook position (because someone has lifted the uncorded handset 60 off the onhook/offhook switch 42). However, the preferred means for turning power to the RF module 58 on is a circuit including a reed switch (not shown) in the RF module 58 and a small permanent magnet (not shown) in the uncorded handset 60. When the uncorded handset 60 is lifted away from the RF module 58, the absence of the magnetic field of the permanent magnet causes the reed switch to change state, which in turn signals the micro-controller 116 to turn on the transmitter/receiver 114.

The details of the radio transmitter/receivers 114/124, the power supply 110, and battery charging circuitry 120/128 have not been described in detail as numerous variations of these are available and are well known in the art. In addition, numerous other variations and modifications may be made without departing from the present invention. Therefore, it should be clearly understood that the form of the present invention described above and shown in the accompanying drawing is illustrative only and is not intended to limit the scope of the present invention, the invention therefore is defined in the claims.

Corded telephones similar to that described above except that they obtain power from the telephone line (POTS), and which therefore lack a jack 46, may also be converted to uncorded operation using the preferred embodiment of the invention if during installation a cap (not shown) is placed over connector 65 to cover the portion of connector 65 that would otherwise be plugged into jack 46. Alternatively, power adaptor 61 may be supplied with a modified connector for connection only to plug 84.

What is claimed is:

1. A kit for converting to cordless operation a telephone having a corded handset and a base unit, the base unit having a handset connector jack and a handset receiving cradle for matingly cradling the handset, the corded handset having a housing, a microphone, a speaker, and a cord for electrically connecting the handset to the handset jack, the kit comprising:

a module matingly engageable with the base unit and having a connector for electrically connecting the module to the handset jack; and an uncorded handset mating with the handset receiving cradle, the uncorded handset having a housing generally matching that of the corded handset and including therewithin a microphone and a speaker spaced from one another at opposite ends of the handset and facing the base unit when the handset is cradled on the cradle and a battery, the module including an electromagnetic transmitter transmitting signals obtained from the handset jack, the uncorded handset including an electromagnetic receiver for receiving, amplifying, and conveying to the speaker signals transmitted by the module, an electromagnetic transmitter for transmitting signals obtained from the microphone, and a permanent magnet, and the module including an electromagnetic receiver for receiving, amplifying and providing signals transmitted by the uncorded handset to the handset jack, and a magnetic field responsive switch responsive to a magnetic field of the permanent magnet in the uncorded handset, wherein the switch opens to supply power to the electromagnetic transmitter and receiver in the module with removal of the uncorded handset from the cradle, thereby removing the magnetic field of the permanent magnet from the proximity of the switch, and wherein the switch closes to stop the supply of power to the electromagnetic transmitter and receiver in the module with re-cradling of the uncorded handset in the cradle, thereby placing the magnetic field of the permanent magnet within the proximity of the switch.

2. The kit as defined in claim 1 wherein the module additionally comprises a fastener for fixing the module in mating engagement with the base unit.

3. A kit for converting to cordless operation a telephone having a corded handset and a base unit, the base unit having a handset connector jack and a handset receiving cradle for matingly cradling the handset, the corded handset having a housing, a microphone, a speaker, and a cord for electrically connecting the handset to the handset jack, the kit comprising:

a module matingly engagable with the base unit and having a connector for electrically connecting the module to the handset jack; and an uncorded handset mating with the handset receiving cradle, the uncorded handset having a housing generally matching that of the corded handset and including therewithin a microphone and a speaker spaced from one another at opposite ends of the handset and facing the base unit when the handset is cradled on the cradle and a rechargeable battery, the module including an electromagnetic transmitter for transmitting signals obtained from the handset jack, the uncorded handset including an electromagnetic receiver for receiving, amplifying and conveying to the speaker signals transmitted by the module, an electromagnetic transmitter for transmitting signals from the microphone, a switch by which power to the electromagnetic transmitter and receiver is turned on by removal of the uncorded handset from the cradle and turned off by re-cradling of the handset in the cradle, and an inductive power receiver connected to the battery, the module including an electromagnetic receiver for receiving, amplifying and providing signals transmitted by the uncorded handset to the handset jack, a switch by which power to the electromagnetic transmitter and receiver in the module is turned on by the removal of the uncorded handset from the cradle and turned off by the re-cradling of the uncorded handset in the cradle, and an inductive power transmitter that is turned on when the electromagnetic transmitter and receiver in the module are turned off, wherein the uncorded handset power switch turns off the electromagnetic transmitter and receiver in the uncorded handset when an induced current rises above a preselected level in the inductive power receiver and turns on the electromagnetic transmitter and receiver in the uncorded handset when the induced current in the inductive power receiver drops below a preselected level.

4. The kit as defined in claim 3 wherein the kit additionally comprises at least two antennas, one of which antennas is connected to a selected one of the electromagnetic transmitter and receiver in the module and is contained within the module and the second of which antennas is connected to a selected one of the electromagnetic transmitter and receiver in the uncorded handset and is contained within the uncorded handset and wherein the electromagnetic transmitters and receivers transmit and receive radio waves.

5. An improvement to a kit for converting to uncorded operation a telephone having a corded handset and a base unit, the base unit having a handset connector jack and a handset receiving cradle for matingly cradling the handset, the corded handset having a housing, a microphone, a speaker, and a cord for electrically connecting the handset to the handset jack, the kit having a module with a connector for electrically connecting the module to the handset jack, an uncorded handset having a housing and including therewithin a microphone and a speaker spaced from one another at opposite ends of the handset and facing the base unit when the handset is cradled on the cradle and a battery, the module including an electromagnetic transmitter for transmitting signals obtained from the handset jack, the uncorded handset including an electromagnetic receiver for receiving, amplifying, and conveying to the speaker the signals transmitted by the module and an electromagnetic transmitter for transmitting signals obtained from the microphone, the module including an electromagnetic receiver for receiving, amplifying, and providing the signals transmitted by the uncorded handset to the handset jack, and wherein the improvement comprises:

the module matingly being engageable with the base unit;

the uncorded handset having a housing generally matching that of the corded handset and mating with the handset receiving cradle, a switch, and a permanent magnet; and the module having a magnetic field responsive switch responsive to a magnetic field of the permanent magnet in the uncorded handset;

wherein the switch opens to supply power to the electromagnetic transmitter and receiver in the module with removal of the uncorded handset from the cradle, thereby removing the magnetic field of the permanent magnet from the proximity of the switch, and wherein the switch closes to stop the supply of power to the electromagnetic transmitter and receiver in the module with re-cradling the uncorded handset in the cradle, thereby placing the magnetic field of the permanent magnet within the proximity of the switch.

6. The improvement as defined in claim 5 wherein the module additionally comprises a fastener for fixing the module in mating engagement with the base unit.

7. The improvement as defined in claim 5 wherein the improvement additionally comprises at least two antennas, one of which antennas is connected to a selected one of the electromagnetic transmitter and receiver in the module and is contained within the module and the second of which antennas is connected to a selected one of the electromagnetic transmitter and receiver in the uncorded handset and is contained within the uncorded handset and wherein the electromagnetic transmitters and receivers transmit and receive radio waves.

8. An improvement to a telephone having a corded handset and a base unit, the base unit having a handset connector jack and a handset receiving cradle for matingly cradling the handset, the corded handset having a housing, a microphone, a speaker, and a cord for electrically connecting the handset to the handset jack, the improvement comprising:

a module in mating engagement with the base unit and a connector electrically connecting the module to the handset jack; and an uncorded handset mating with the handset receiving cradle, the uncorded handset having a housing generally matching that of the corded handset and including therewithin a microphone and a speaker spaced from one another at opposite ends of the handset and facing the base unit when the handset is cradled on the cradle and a rechargeable battery, the module including an electromagnetic transmitter for transmitting signals obtained from the handset jack, the uncorded handset including an electromagnetic receiver for receiving, amplifying, and conveying to the speaker the signals transmitted by the module, an electromagnetic transmitter for transmitting signals obtained from the microphone, a switch, and an inductive power receiver connected to the battery, and the module including an electromagnetic receiver for receiving, amplifying, and providing the signals transmitted by the uncorded handset to the handset jack and an inductive power transmitter that is turned on when the electromagnetic transmitter and receiver in the module are turned off, wherein the uncorded handset power switch turns off the electromagnetic transmitter and receiver in the uncorded handset when an induced current rises above a preselected level in the inductive power receiver and turns on the electromagnetic transmitter and receiver in the uncorded handset when the induced current in the inductive power receiver drops below a preselected level.

9. The improvement as defined in claim 8 additionally comprising at least two antennas, one of which antennas is connected to a selected one of the electromagnetic transmitter and receiver in the module and is contained within the module and the second of which antennas is connected to a selected one of the electromagnetic transmitter and receiver in the uncorded handset and is contained within the uncorded handset and wherein the electromagnetic transmitters and receivers transmit and receive radio waves.

10. A telephone comprising:

a base unit, the base unit having a handset connector jack and a handset receiving cradle;

a module matingly engageable with the base unit and having a connector for electrically connecting the module to the handset jack; and an uncorded handset mating with the handset receiving cradle, the uncorded handset including therewithin a microphone and a speaker spaced from one another at opposite ends of the handset and facing the base unit when the handset is cradled on the cradle and a battery, the module including an electromagnetic transmitter for transmitting signals obtained from the handset jack, the uncorded handset including an electromagnetic receiver for receiving, amplifying, and conveying to the speaker the signals transmitted by the module and an electromagnetic transmitter for transmitting signals obtained from the microphone and a permanent magnet, and the module including an electromagnetic receiver for receiving, amplifying, and providing the signals transmitted by the uncorded handset to the handset jack, and a magnetic field responsive switch responsive to a magnetic field of the permanent magnet in the uncorded handset, wherein the switch opens to supply power to the electromagnetic transmitter and receiver in the module with removal of the uncorded handset from the cradle, thereby removing the magnetic field of the permanent magnet from the proximity of the switch, and wherein the switch closes to stop the supply of power to the electromagnetic transmitter and receiver in the module by recradling the uncorded handset in the cradle, thereby placing the magnetic field of the permanent magnet within the proximity of the switch.

11. The telephone as defined in claim 10 wherein the module additionally comprises a fastener for fixing the module in mating engagement with the base unit.

12. The improvement as defined in claim 10 additionally comprising at least two antennas, one of which antennas is connected to a selected one of the electromagnetic transmitter and receiver in the module and is contained within the module and the second of which antennas is connected to a selected one of the electromagnetic transmitter and receiver in the uncorded handset and is contained within the uncorded handset and wherein the electromagnetic transmitters and receivers transmit and receive radio waves.

* * * * *